United States Patent [19]

Holman

[11] 3,924,571

[45] Dec. 9, 1975

[54] ANIMAL CAGING SYSTEM

[75] Inventor: Frank Brouwer Holman, Lakewood, N.J.

[73] Assignees: Lorraine Chirico, Howell; John R. Fulcher, Toms River, both of N.J. ; part interest to each

[22] Filed: Dec. 7, 1973

[21] Appl. No.: 422,901

[52] U.S. Cl. ............... 119/15; 119/18; 119/19
[51] Int. Cl.²............................................ A01K 1/02
[58] Field of Search ............ 119/15, 17, 18, 19, 21, 119/22

[56] References Cited
UNITED STATES PATENTS

| | | | |
|---|---|---|---|
| 2,335,173 | 11/1943 | Corey | 119/21 |
| 3,464,388 | 9/1969 | Stout | 119/15 |
| 3,557,756 | 1/1971 | Ramsey | 119/15 |
| 3,662,713 | 5/1972 | Sachs | 119/15 X |

*Primary Examiner*—Hugh R. Chamblee
*Attorney, Agent, or Firm*—Harold L. Stowell

[57] ABSTRACT

A system for caging animals, especially for holding research animals on long term studies, has a number of independent cage enclosures arranged together as a multiple unit modular structure with each cage enclosure being supplied on an individual and separate basis with temperature and humidity controlled bacteria free air so that cross-contamination from animal to animal is prevented. Each cage enclosure has its own source of water for the enclosed animal and means is provided for flushing out each cage enclosure on an individual basis.

6 Claims, 10 Drawing Figures

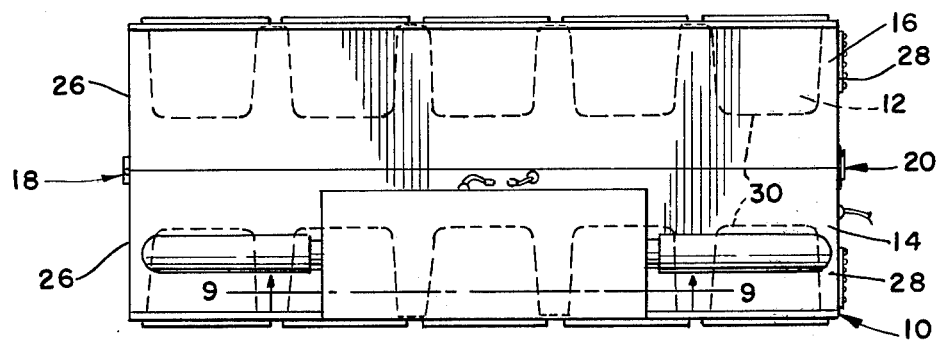
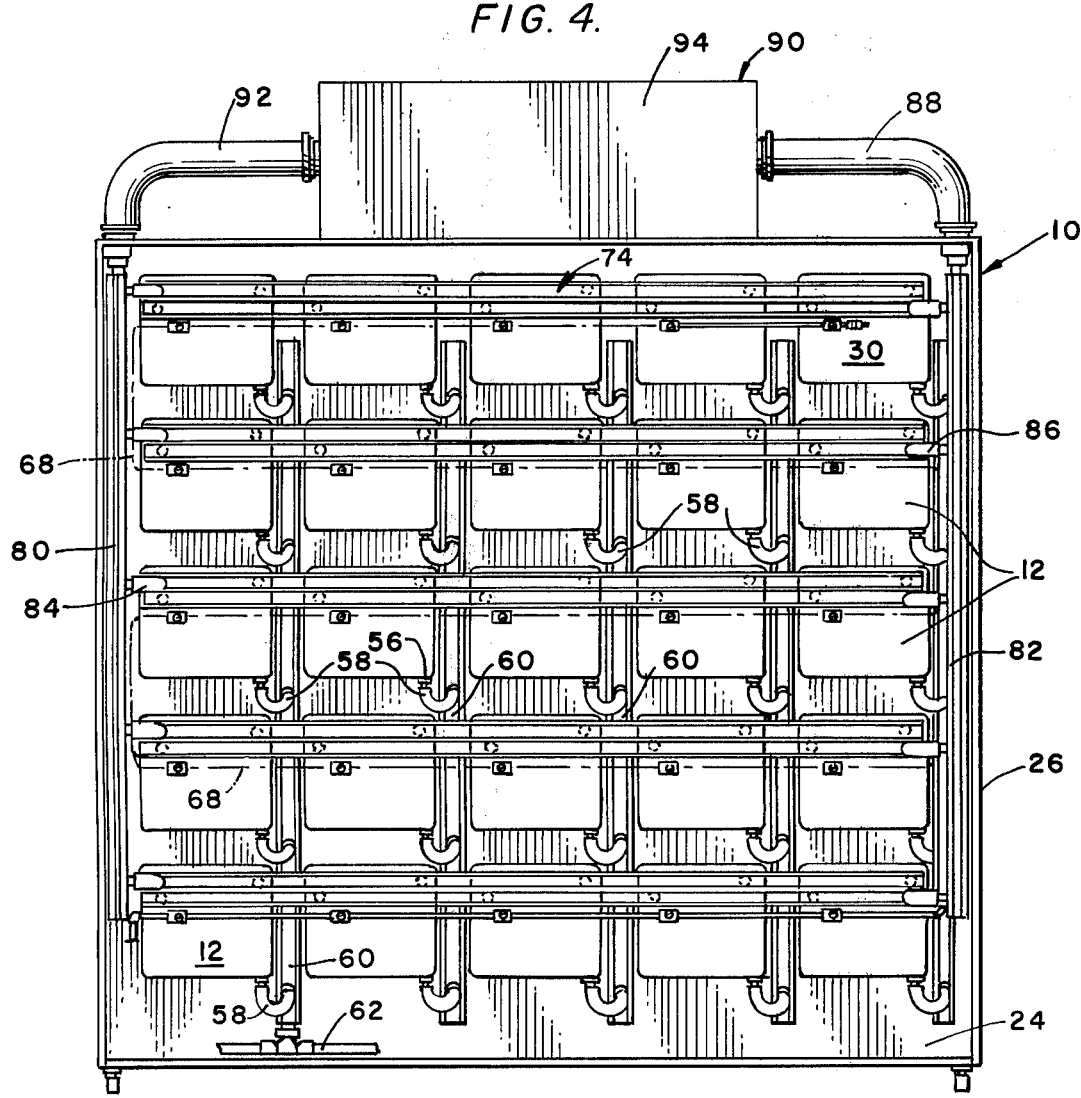

3,924,571

1

ANIMAL CAGING SYSTEM

BACKGROUND OF THE INVENTION

1. Field Of The Invention

The present invention generally appertains to new and novel improvements in animal cages and especially relates to a new and novel system and cage unit for housing animals, especially, though not restrictively, laboratory animals in a germ free environment.

2. State Of The Prior Art

Up until the present invention, there have been only two arrangements employed to house research or laboratory animals in a substantially germ free atmosphere.

The first system involves providing a true barrier building, which is a concept that has been widely used in Europe, as well as in the United States. Such building requires special construction comprising the clean/dirty corridor concept, as well as one way direction for the flow of equipment, feed and personnel. It also requires great expenditures of monies for the sterilization of all equipment coming into the building, usually utilizing an autoclave, gas chamber and a pass through tank, as well as extreme precautions for the entrance of personnel through a system of automatic locks, shower facilities and the donning of sterile garments.

After all these precautions are taken, animal protection is based only on the room concept. The barrier building concept provides only room to room protection. Thus, when an animal in one room becomes infected, the infection spreads throughout the whole room. There is no way in such barrier building system to prevent cross contamination from animal to animal in the same room. This is an accepted risk in the utilization of this type of animal housing construction.

The second system presently utilized to provide barrier protection involves the so-called hard walled vertical laminar flow concept of providing absolute filtered air in a vertical pattern within a confined space. Such system depends on the air leaving the ceiling in a straight vertical line. Therefore, this theoretically assumes that each animal would get clean air and thereby prevent cross contamination.

The theory of this confinement is workable, as long as the animals are placed on a false or perforated floor so that the air leaving the ceiling exits the room through the perforated floor so that the air flow is absolutely straight down over the animals in an individual fashion. In this case, it is true that each animal should breathe first air, but this would pose other problems of cross contamination by the physical contact of the animals running around on the floor.

The method of utilizing this type of equipment at the present time involves the utilization of conventional animal cage racks that are wheeled into a clean room and situated so that each is separately exposed to the high velocity vertical air flow.

But such arrangement does not prevent cross contamination within the room because the cage racks themselves will disrupt the air pattern and cause immediate vortices, which will transfer the air from one cage into another. Possibly, this can be checked by walking into a vertical laminar room, with such caging, with a smoke bomb or the like. But, this necessitates expenditures of time and monies by a research organization that must purchase the clean room and all the environmental equipment involved and then must purchase the cages.

2

Consequently, it can be appreciated that there is a need for a clean air animal cage system in the medical research field. This need must be satisfied on a basis of economical operation with a true animal isolation.

SUMMARY OF THE INVENTION

A primary object of the present invention is to provide an animal housing system, particularly for the holding of research animals on a long term study basis, that is economical to operate, that provides for true isolation of the animals in any given room, that provides for the direct delivery of temperature and humidity controlled bacteria free air to each animal and that prevents cross contamination from animal to animal.

Another important object of the present invention is to provide an animal caging system wherein each caged animal has its own clean air delivery system so that each animal has its own individual clean air environment which is not affected by another animal's environment whereby there is no possibility of cross contamination from animal to animal.

Another important object of the present invention is to provide a clean air animal caging system that can operate either positive or negative in respect to atmospheric pressure. The system would operate negatively in respect to the atmosphere if the caged animals present a health hazard to man. And it would operate positively in respect to the atmosphere if the animals present a health hazard to each other.

Another important object of the present invention is to provide an animal caging system wherein cages have watering and flushing services so that sanitation and watering costs are substantially reduced while the cages are maintained clean and under complete environmental control.

Another important object of the present invention is to provide a multiplicity of cage enclosures or units which are assembled together into a modular structure that can be easily moved into and within a clean confining room and wherein bacteria free air is independently delivered to each cage unit under complete environmental control to maintain the temperature and relative humidity in each cage unit within chosen parameters.

BRIEF DESCRIPTION OF THE DRAWINGS

FIG. 3 is a top plan view of the animal caging system of FIG. 1.

FIG. 4 is a rear elevational view of such animal caging system.

DESCRIPTION OF THE PREFERRED EMBODIMENTS

Figure 2:
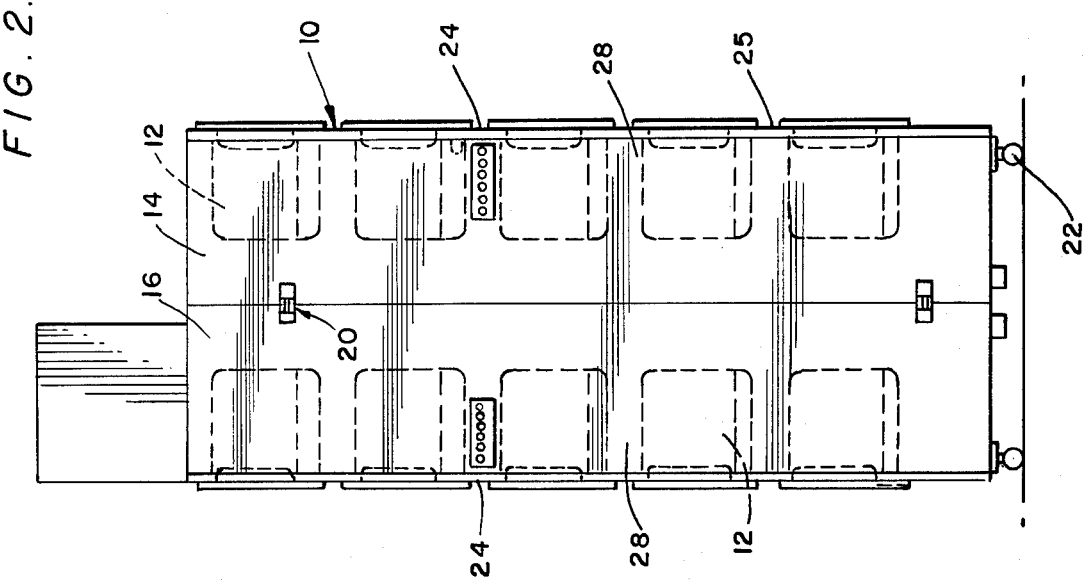
FIG. 2 is a side elevational view of the animal caging system of FIG. 1.

Referring now more particularly to the accompanying drawings and initially to FIGS. 1–9, the animal caging system, generally designated by reference numeral 10, comprises a multiplicity of individual and identical cages or enclosures 12 which are arranged in rows and columns into complementary modular structures 14 and 16. Such modular structures containing the rectilinearly patterned battery of spaced apart cages 12 are disposed in back-to-back relation, as shown in FIGS. 2 and 3, and are hingedly connected at one end by hinges 18 and provided with latch means 20 at their opposite end. The structures are mounted on swivel casters 22 so that they are very mobile for movement into and within a confining room.

Each of the modular structures includes a flat front wall 24 and opposing flat end walls 26 and 28. The walls may be fabricated from metal, plastic, or other suitable material. The front and end walls are assembled together by an aluminum angle frame 25. The end walls 26 of the modular structures 14 and 16 are connected together by the hinge means 18 and the end walls 28 are provided with the latch means 20.

The cages 12 are individually fabricated from suitable materials, such as plastic engineering resins having desired impact resistance and toughness capable of maintaining their properties over a wide period of use. Each of the cages 12, which may be fabricated from any other suitable material, is formed with a back wall 30, a rearwardly sloping bottom wall 32 and a rearwardly inclined top wall 34 with the top and bottom walls being connected by opposing side walls 36. Each of the cages 12 has an open front 38 with the front edges of the bottom, top and side walls being provided with laterally extending flanges 40 that constitute a peripheral mounting rim on the front of the cages. The cages are inserted within openings provided in the front walls 24 of the modular structures 14 and 16 with the mounting rim 40 of each cage being suitably fastened to the portions of the front walls bounding the openings.

Figure 1:
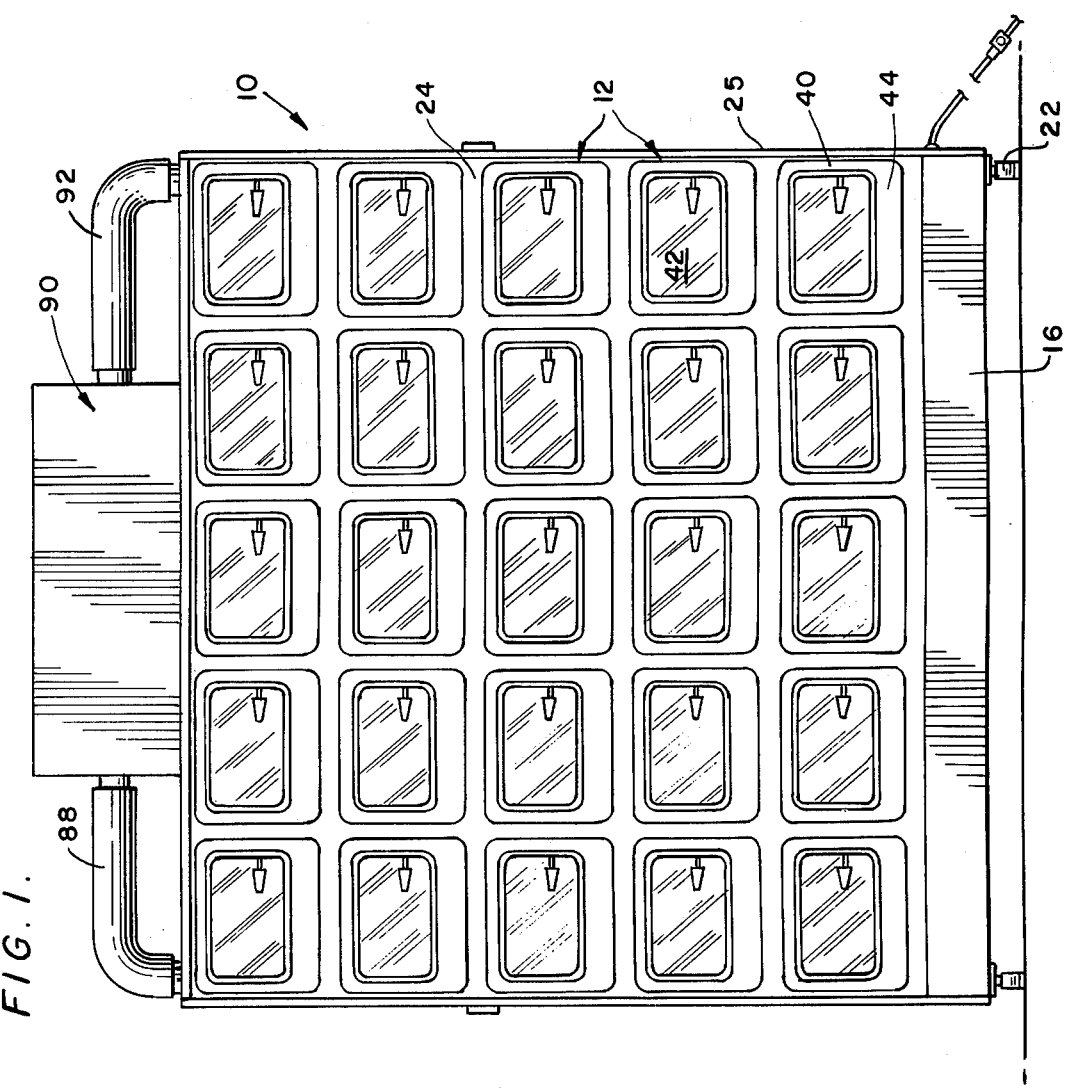
FIG. 1 is a front elevational view of the animal caging or housing system composed of a multiplicity or battery of individual cage enclosures or units assembled together into the mobile modular structure and individually supplied with bacteria free air from a single air purification and conditioner means.

As aforestated and as can be appreciated from a consideration of FIG. 1, the front wall 24 of each of the structures 14 and 16 is preferably substantially square and the openings are arranged so as to dispose the cages in a side by side row arrangement and in a vertically arranged column arrangement. The cages of the structures 14 and 16, when such structures are locked together, as shown in FIGS. 2 and 3, have their back walls in spaced apart confronting relation and the rear ends of the structures 14 and 16 are open so as to expose the back walls 30 and so as to permit access to the air and water supply arrangements connected to each cage.

The open fronts 38 of the cages are closed off by recessed plexiglass doors 42. Below each of the doors a plastic filler 44 is fitted so as to complement the doors in closing off the open fronts 38 of the cages.

Each of the cages has a steel wire mesh false bottom 46 which is supported by legs 48 resting on the bottom wall 32. The false bottom is supported so that it slopes forwardly and the front edge 50 thereof engages the filler 44, which constitutes a water barrier. In this respect, a flushing pipe 52 sealingly extends through suitable openings in the opposing side walls 36 of the cages and is disposed horizontally behind the barriers 44 in the cages. A flushing pipe is provided for each row. The flushing pipes are provided with apertures 54 in their portions enclosed within each of the cages and are adapted to discharge a flushing water which flows over the bottom walls 32 of the cages to remove excretions, hair, heavy particulates, and all other foreign material falling through the false bottom 46 onto the bottom walls 32 of the cages. The flow of water through the pipes 52, which are interconnected, can be manually or automatically controlled depending on user preference.

Figure 6:
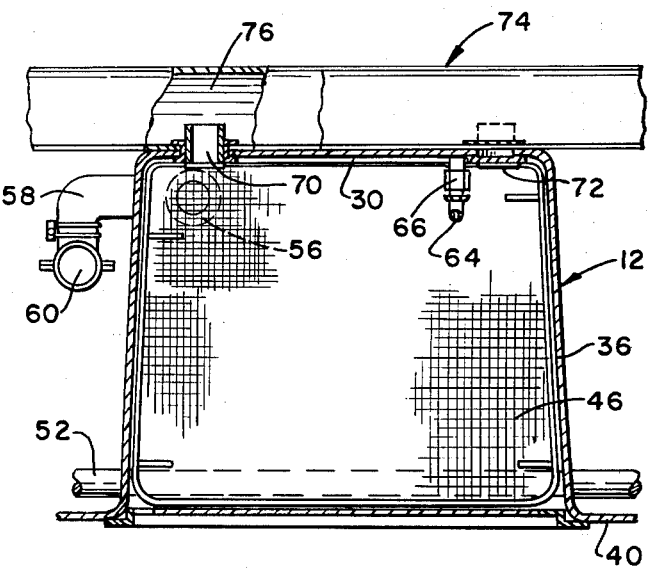
FIG. 6 is a horizontal cross-sectional view taken substantially on line 6—6 of FIG. 5.

The flushing water flows over the bottom walls 32 of the cages and is discharged from each cage through a drain pipe 56 which is provided at one corner of each of the bottom walls of the cages, as shown in FIGS. 4 and 6. The drain pipes 56 are connected by elbows 58 to vertically disposed outlet pipes 60. The outlet pipes are vertically arranged so as to serve via the elbows 58 each of the tanks in a given column, as is shown in FIG. 4, with one pipe for each column of cages. The lower discharge ends of the vertical outlet pipes 60 are connected to a common discharge pipe 62, as shown in FIG. 4, which leads to a sewer hook-up (not shown).

Each of the cages 12 is provided with an automatic, valve regulated water feeding nozzle 64 for the housed animals. Each nozzle is connected by a pipe 66 extending through the rear wall of each cage to a water feeding piping 68 that is arranged in a serpentine fashion along the rows of cages and down the insides of the end walls of the structures, as shown in FIG. 4.

Figure 5:
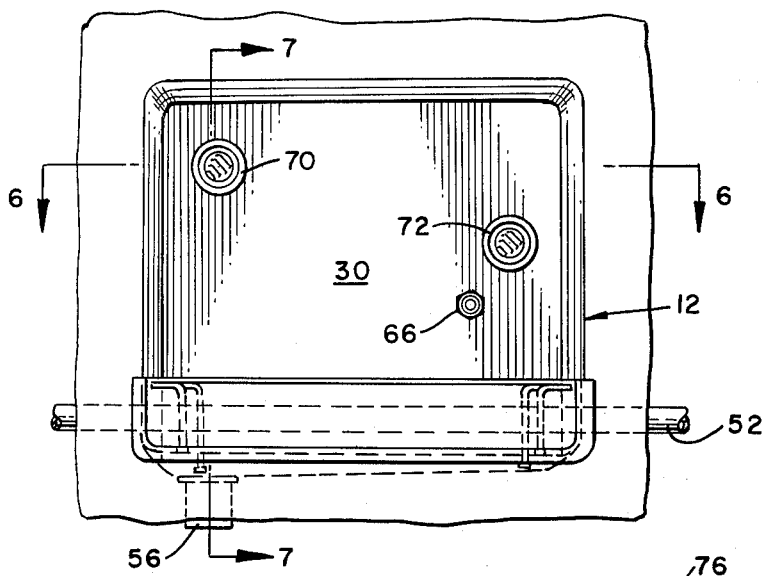
FIG. 5 is a rear elevational view of one of the cage enclosures or units, per se.
Figure 7:
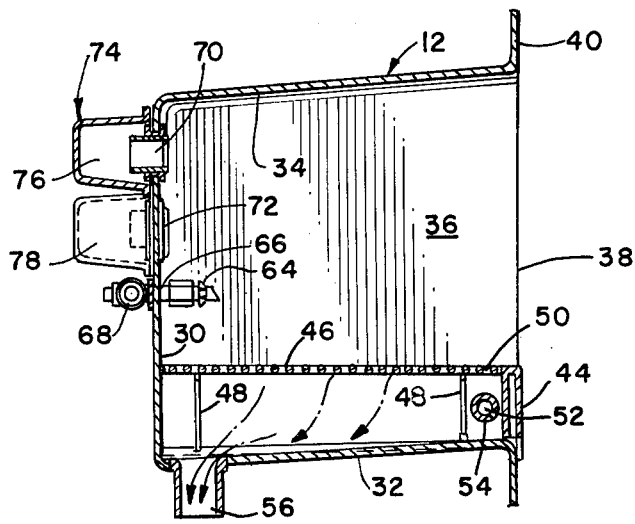
FIG. 7 is a vertical cross-sectional view taken substantially on line 7—7 of FIG. 5.
Figure 8:
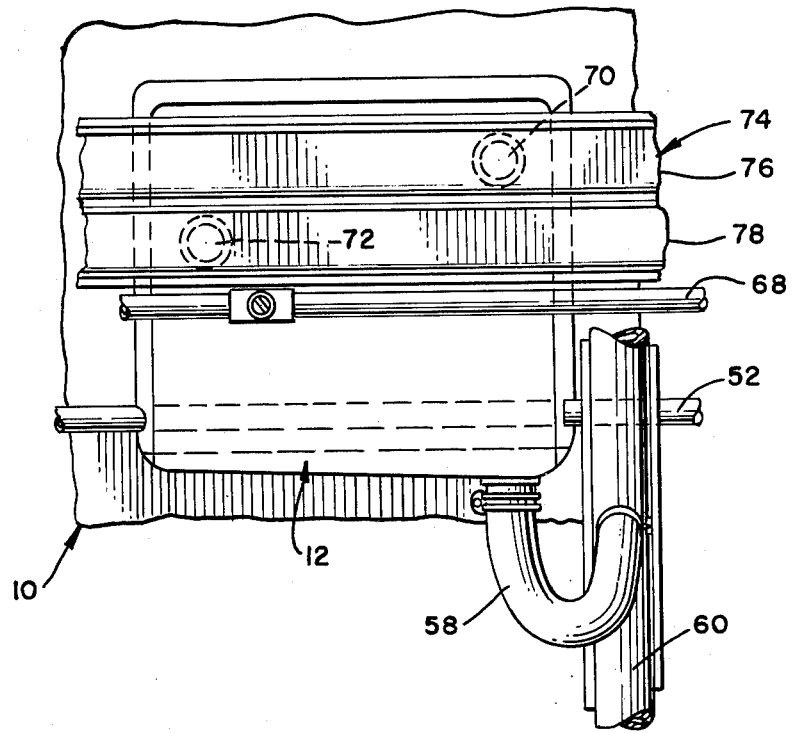
FIG. 8 is a rear elevational view of the cage enclosure showing the air conduits, water feeder pipe and flushing arrangements for each cage enclosure.

Each of the cages, as shown more particularly in FIGS. 5–7, has its rear wall 30 provided with a plastic incoming air vent 70 at one end and a plastic outgoing air vent 72 at the opposing end. The air vents are in communication with a double plenum 74 which is molded from suitable plastic engineering resins and which provides a clean air supply plenum chamber 76 and a dirty air exhaust plenum chamber 78. The plenum 74, as shown more particularly in FIG. 7, is affixed to the rear walls of the cages so that the vent 70 is in communication with the air supply chamber 76 while the vent 72 is in communication with the exhaust chamber 78.

As shown in FIG. 4, the plenums extend transversely across each row of cages so that one plenum serves all of the cages in a given row. The plenums are communicated with an air supply tubing 80 vertically arranged at one end of each of the structures 14 and 16 and an air exhaust tubing 82 vertically arranged at the opposite end of each of the structures. By means of couplings 84 the air supply chambers of each of the plenums are communicated with the vertically disposed air supply tube 80. Similarly, by means of couplings 86, the air exhaust chambers 78 of the plenums are communicated with the vertical air exhaust tubing 82.

The air exhaust tubing is connected by means of a conduit 88 with the intake side of an air purification and conditioner means 90 which has its output end connected by a conduit 92 with the air supply pipe 80 for the plenums. The air purification and conditioner means 90 is a central unit that supplies all of the cages in both of the structures via the tubings 80 and 82 and the plenums 74 with temperature and humidity controlled bacteria free air. While the air purificationer and conditioner means 90 is shown in FIG. 4 as being mounted on the modular structure, it can be disposed remote therefrom and from the cages which would merely entail a different and more extensive conduit 88 and conduit 92.

Figure 9:
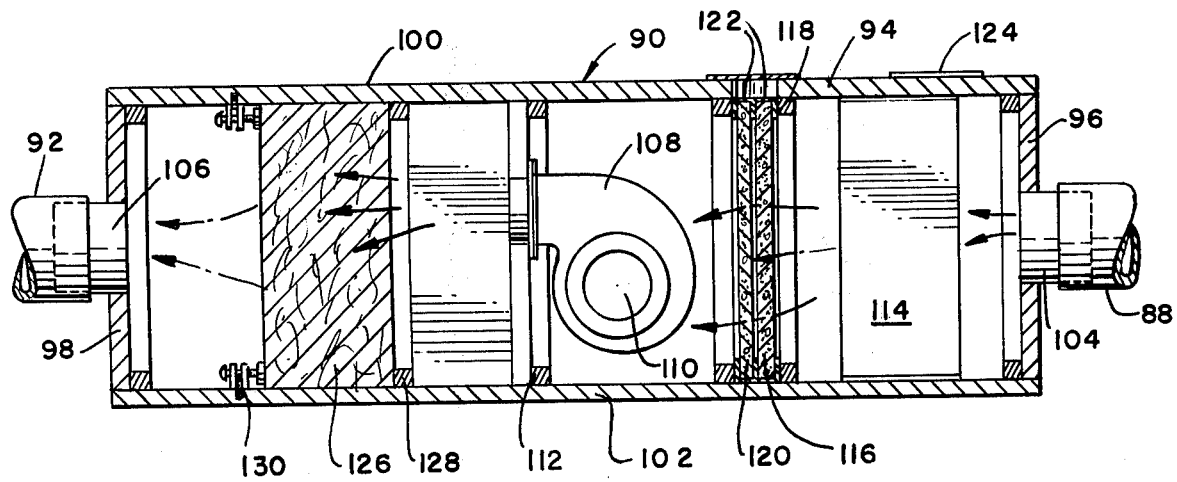
FIG. 9 is a longitudinal vertical sectional view of the air purification and conditioner means and is taken substantially on line 9—9 of FIG. 2.

In any event, the air purification and conditioner means 90, as shown more particularly in FIG. 9, comprises a duct-like housing 94, which is constructed from particle board. All of the exterior surfaces are laminate in high pressure plastic laminate. The housing 94 has opposing end walls 96 and 98 and opposing side walls and top and bottom walls 100 and 102. The end wall 96 is the inlet end while the end wall 98 constitutes the outlet end. Accordingly, the conduit 88 from the vertical air exhaust tubing 82 is connected to a collar 104 which is sealingly fitted within an opening in the end wall 96. And the conduit 92 is fitted on a collar 106 which is sealingly mounted in a suitable opening in the end wall 98. Substantially mid-way between the end walls 96 and 98 a blower 108 with a motor 110 is mounted by means of a supporting framework 112.

A temperature and humidity control means 114 is disposed transversely within the housing 94 between the end wall 96 and a prefilter 116. The prefilter, which may be fabricated from fiberglass or other similar material, is held by a framework 118 in a position transversely of the housing 94 immediately downstream from a charcoal or activated carbon filter 120. The filters 116 and 120 are provided with edge frames 122 whereby they are supported between the spaced open sections of the framework 118 and whereby they are slightly spaced apart from each other.

The prefilter 116 serves to remove all of the larger particulates from the incoming dirty air stream which, after passing through the prefilter 116, is drawn by the blower 108 through the activated carbon or charcoal filter 120 which serves to remove odors from the air stream. The top wall 100 of the housing 94 in advance of the temperature and humidity control means 114 is provided with a grill 124 for the admission of make-up air into the housing 94 to inermix with the incoming dirty air stream. And, if necessary, the side walls and bottom wall can be provided with such grills for the admission of fresh, outside air into the housing.

After the air stream is drawn by the blower 108 through the prefilter 118 and through the activated carbon or charcoal filter 120 it is forced by the blower through an absolute filter 126 which is positioned within the housing 94 downstream from the blower and intermediate the blower and the end wall 98. The absolute filter is held against an open frame 128 by clamps 130.

The absolute filter which is sometimes referred to as a super-interception or HEPA (high efficiency particulate air) filter is so characterized because of the extremely high particle and dirt retention characteristics it possesses. The filter is a physical filter fine enough and thick enough to trap the particles in a small micron range. It may be fabricated of certain filter papers composed of glass, ceramic or cellulose-asbestos fibers. It is constructed to remove the very smallest dust particles from the air stream at extremely high efficiency.

Such absolute filter 126, as known in the gas treatment art, will take out 99 percent of all particulates within the 1 to 0.01 micron range. Such absolute or HEPA filter will remove particle sizes down to 3/10 of a micron. Experience has also shown that particle sizes smaller than 3/10 of a micron will not pass the absolute filter 126 because these particles are generally air borne on much larger particles which are trapped routinely by such filter.

It can be appreciated that the air purification and conditioner means 90 serves as a central or single unit for the battery of cages. Clean air is discharged from the housing 94 through the conduit 92 to enter the vertical air piping 80 from whence it passes by means of the couplings 84 into the air supply chambers of each of the plenums 74. At the same time, the blower 108 is active to draw the dirty air exhausted through the vent 72 in each cage into the outlet chamber 78 of each plenum and thence through the couplings 86 into the vertically oriented dirty air tubing 82 from whence it passes through the conduit 88 into the intake end of the housing 94.

The air is drawn by the blower 108 through the temperature and humidity control means 114 and, at the same time, the dirty air is joined by fresh, outside air introduced into the housing through the grill or grills 124. The make-up air and dirty air are both simultaneously passed through the prefilter 116 which removes all the larger particulates. After passing through the prefilter, the air is drawn through the activated carbon or charcoal filter 120 which removes all odors therefrom.

The blower is equipped to operate at adjustable speed controls so as to compensate for changes in static pressure caused by contamination build-up in and the static pressure of the absolute or HEPA filter 126 and to insure proper air flow rates. It forces the thusly cleaned and deodorized air through the absolute filter 126 wherein 99 percent of all particulates within the 1 to 0.01 micron range are removed or trapped routinely. The thusly cleaned air is then forced through the conduit 92 into the clean air chambers 76 in each of the plenums 74 for introduction into each cage 12 through the clean air vents 70 provided in each cage.

Thus, it can be seen that the air in each cage is constantly being replenished and that there is direct delivery of temperature and humidity controlled bacteria free air to each cage without any possibility of cross mixing of air from cage to cage. The system 10 prevents cross contamination from animal to animal and provides true isolation of the animals, even though they are housed closely together in the compact and space saving modular structures 14 and 16.

While the arrangement thusly described involves single central temperature and humidity control means 90, it is envisioned that each cage can be provided with its own separate and individual air filtration arrangement, which will still have the same three stage filtration concept, i.e., prefilter, activated carbon unit and an absolute or HEPA filter, of the central air purification and conditioner means 90.

Figure 10:
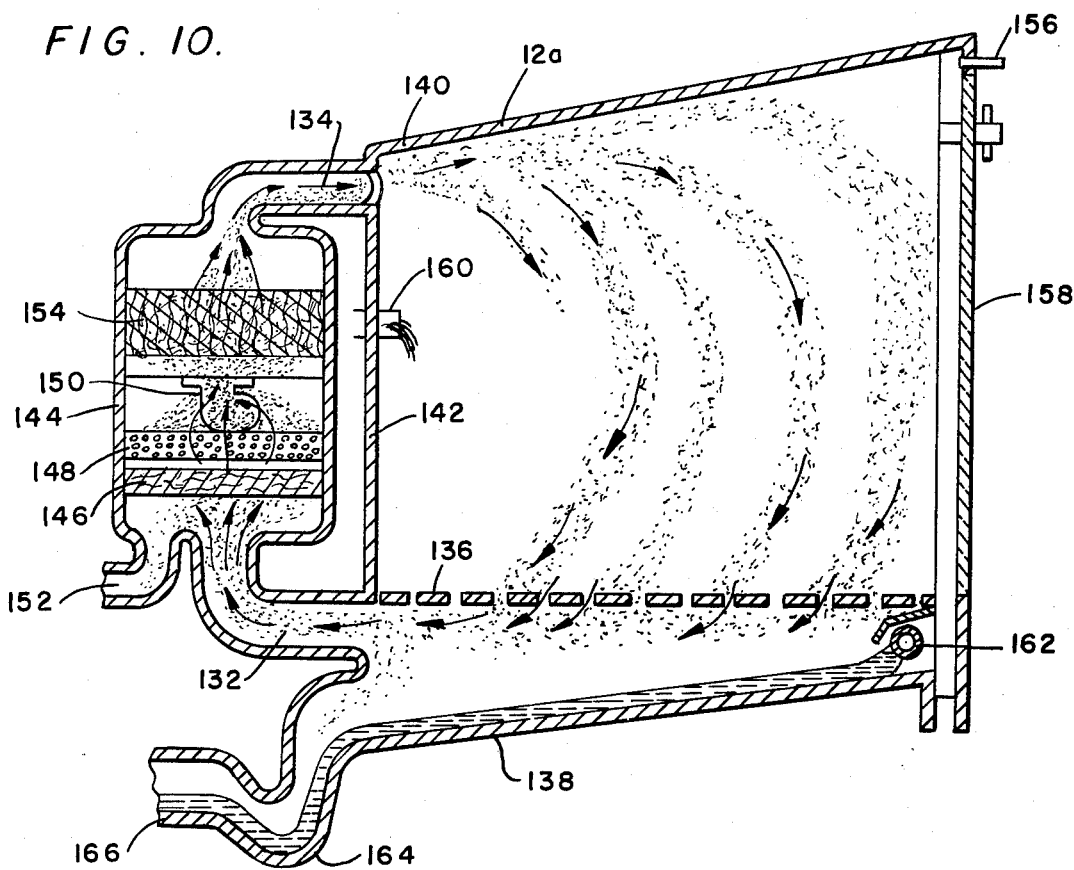
FIG. 10 is a vertical sectional view of a modified form of cage enclosure or unit which has its own independent air system as opposed to the central air purification and conditioner arrangement of FIGS. 1–9.

Thus, as shown in FIG. 10, the cage 12a is provided with a dirty air exit port 132 and with a clean air entry port 134. The dirty air exit port 132 is disposed below the false bottom 136 of the cage and above the rearwardly sloping bottom wall 138. The clean air entry port 134 is provided at the top wall 140 with both of the ports being provided in the back wall 142 of the cage.

A housing 144, which is illustrated as being integral with the ports that are shown as being formed integral with the back wall of the cage but which can be a separate unit, houses the prefilter 146 and the carbon filter 148. Such filters are arranged downstream from the blower 150. A make-up port 152 is provided at the lower end of the housing for the entry of fresh outside air. And, of course, while not shown, a temperature and humidity control means can be arranged within the housing downstream from the prefilter 146. An absolute or HEPA filter 154 is positioned within the housing 144 upstream from the blower.

From a consideration of FIG. 10, it can be understood that, as the air flows through the cage 12a, it becomes contaminated with hair, odor and bacteria and such dirty air is drawn by the fan 150 into the exit port 132. At this point, the dirty air is joined by fresh, outside air introduced into the housing through the make-up port 152. The air is then passed through the temperature and humidity control means, if provided, and then through the prefilter 146 which removes all of the larger particulates.

After passing through the prefilter 146, the air is drawn through the activated carbon filter 148 which removes all odors and into the blower 150, which is designed to overcome the spatic pressure of the absolute or HEPA filter 154 and then through the HEPA filter 154 for return through the port 134 to the cage. The blower 150 is equipped with adjustable speed controls to compensate for changes in static pressure caused by contamination build-up and to insure proper air flow rates. An exhaust port 156 is provided in the front wall above the glass door 158 to relieve interior chamber pressure and allow air to be discharged from the interior of the cage 12a at a controlled rate.

The cage is provided with an animal watering arrangement 160 and with a flushing arrangement 162 in the same manner as the cages 12. The watering and flushing systems function independently with the watering being automatic and the flushing being either automatic or manual, depending on user preference.

As can be appreciated, the water issuing from the apertures in the flushing pipe 162 will flow down over the rearwardly sloping rear wall 148 into the trap 164 and from thence through the pipe 166 to an outlet system, such as disclosed in connection with the cages 12.

Both the systems of FIGS. 1–9 and FIG. 10 may operate either positive or negative in respect to atmospheric pressure. The systems would operate negatively in respect to the atmosphere if the animals present a health hazard to man and positively if they present a health hazard to each other. Operation under positive pressure would reduce the tendency of unfiltered air from entering the individual cages 12 or 12a.

It can thus be appreciated that, with either the central unit arrangement of FIGS. 1–9 or the single cage unit of FIG. 10, an animal housed in the cages 12 or 12a will be maintained in a barrier animal caging system so as to permit the most economical protection for germ free, gnotobiotic and isolation for animals, especially conventional laboratory animals.

What is claimed is:

1. A system for caging animals comprising a battery of independent closed wall cages, an air purification means and means connecting the output of said air purification means to each cage in an individual manner so that each cage is supplied with bacteria free air and means connecting each cage to exhaust its dirty air on an individual basis back to said air purification means whereby cross contamination from animal to animal housed in the cages is prevented, said connecting means comprising an elongated double plenum duct in fluid communication with a plurality of said cages, one plenum of said double plenum duct supplying purified air to each of said cages, the other plenum of said double plenum duct exhausting dirty air from each of said cages.

2. The system of claim 1 wherein said cage enclosures are assembled into a modular structure.

3. The system of claim 1 wherein each cage is provided with an animal feed water means and with means for flushing out the cage.

4. The system of claim 1 wherein said elongated plenum duct is affixed to the walls of said plurality of cages.

5. The system of claim 1 including at least a second elongated double plenum duct similarly affixed to a second and different plurality of said cages, the purified air plenums of said ducts being coupled to the output of said air purification means and the exhaust dirty air plenums of said ducts being coupled to the input of said air purification means.

6. The system of claim 5 wherein said first and second elongated plenum ducts are parallel.

* * * * *